United States Patent
Dalibor et al.

[15] 3,666,833
[45] May 30, 1972

[54] METHOD FOR MANUFACTURING SURFACE COATINGS AND FILMS AND SURFACE COATINGS AND FILMS FOR CARRYING OUT THIS METHOD

[72] Inventors: Horst Dalibor; Themistoklis Katsibas, both of Hamburg, Germany

[73] Assignee: Reichhold, Albert, Chemie Aktiengesellschaft, Hamburg, Germany

[22] Filed: May 27, 1970

[21] Appl. No.: 40,757

[30] Foreign Application Priority Data

May 27, 1969   Switzerland ..........................7986/69

[52] U.S. Cl.....................260/856, 117/132 B, 117/138.8 A, 117/142, 117/448, 260/77.5 CR, 117/128.4
[51] Int. Cl..........................................................C08g 22/04
[58] Field of Search............260/77.5 CR, 859 R; 117/128.4, 117/132 B, 138.8 A, 142, 148

[56] References Cited

UNITED STATES PATENTS 3,404,107   10/1968   Bearden et al..........................260/2.5

*Primary Examiner*—Donald E. Czaja
*Assistant Examiner*—M. J. Welsh
*Attorney*—Gordon W. Hueschen and Talivaldis Cepuritis

[57] ABSTRACT

The invention relates to an improved method for providing surface sheetings or coatings and to a stoving enamel for carrying out this method, the enamel being resistant to solvents and alkalis, wherein the improvement comprises that the stoving enamel, applied to a metal base, hardens after three to four days' exposure to air at about 20° C so that the film does not swell under the action of water and cannot be removed by scratching, and wherein the said film is made by forming under simultaneous removal of the solvent from polyhydroxyl compounds, based on copolymers containing hydroxyl groups, copolymerized aromatic substances and polyisocyanates in solvents, without active hydrogen atoms.

10 Claims, 4 Drawing Figures

Patented May 30, 1972 3,666,833

INVENTORS
HORST DALIBOR
THEMISTOKLIS KATSIBAS
BY
ATTORNEYS

METHOD FOR MANUFACTURING SURFACE COATINGS AND FILMS AND SURFACE COATINGS AND FILMS FOR CARRYING OUT THIS METHOD

DESCRIPTION

There have been numerous proposals for producing lacquers and varnishes which are resistant to solvents and alkalis by reacting polyisocyanates and copolymers containing hydroxyl groups, and to use these for manufacturing flat configurations and coatings. German specification, No. 1,247,006 discloses a method for manufacturing surface configurations resistant to alkalis and made from copolymers containing hydroxyl groups and polyisocyanates, but these are not sufficiently resistant to water after a reaction lasting for three to four days at 20° C. For this reason, these coatings made by means of the known method are unsuitable for covering lacquers and varnishes being exposed to the weather, because they tend to form bubbles after very short periods, the adhesion of the coating to different metal bases is not satisfactory and the lacquer or varnish becomes detached from its base.

It is also known to harden polyhydroxyl compounds of polyols with polyisocyanates in order to obtain cross-linked coatings of lacquer with good resistance. However, also these combinations are not very resistant to water and insufficient weathering properties of the hardened lacquer coatings also follow.

It is an object of the invention to provide a method for producing coatings and flat configurations, resistant to alkalis, according to the polyisocyanate polyaddition method, wherein the resulting coatings and the like exhibit improved properties.

It is a further object of the invention to provide a reaction varnish or lacquer according to the method hereinbefore outlined, which hardens on a metal base after three to four days' drying on the air at 20° C, wherein the film no longer tends to swell under the action of water and cannot be removed mechanically by scratching, even if the film or coating is exposed to water at 50° – 70° C for short periods.

According to the invention, these objects are realized by a method for manufacturing coatings and surface films of polyhydroxyl compounds, based on copolymers containing hydroxyl groups and copolymerized vinyl aromatics and polyisocyanates in solvents, without active hydrogen atoms, by forming under simultaneous removal of water, using:

A. 70 to 94 % w/w copolymers containing hydroxyl groups, made from
  a. 38 – 70 % w/w styrene or alkyl styrene, the alkyl groups of which contain one to three carbon atoms, or a mixture of such alkyl groups,
  b. 0 – 25 % w/w acrylic acid ester and/or methacrylic acid ester, containing one to 12 carbon atoms in the saturated alcohol radical,
  c. 3 – 15 % w/w of an $\alpha,\beta$-ethylenically unsaturated monocarboxylic or dicarboxylic acid
  d. 10 – 40 % w/w glycidyl ester $\alpha$-alkylalkane monocarboxylic acids and/or $\alpha,\alpha$-dialkylalkane monoxarboxylic acids with the following empirical formula $C_{12-14}H_{22-26}O_3$, wherein the amounts of the compounds under (a) to (d) must form 100 % w/w and B. 6 – 30 % w/w of organic polyisocyanate, wherein (A) and (B) must give together numerical values of 100 % w/w.

A special embodiment of the invention is characterized by using

A. 75 – 90 % w/w copolymers containing hydroxyl groups and made from:
  a. 45 – 60 % w/w styrene or vinyl toluene,
  b. 0 – 20 % w/w acrylates and/or methacrylates of saturated mono-alcohols with one to 12 C atoms,
  c. 5 – 10 % w/w acrylic acid or methacrylic acid,
  d. 15 – 35 % w/w glycidyl esters of $\alpha$-alkylalkane monocarboxylic acids and/or $\alpha,\alpha$-dialkylalkane monocarboxylic acids with the following empirical formula $C_{12-14}H_{22-26}O_3$, wherein the amounts of the compounds (a) to (d) must total 100 % w/w, and B. 10 – 25 % w/w of an organic polyisocyanate, wherein (A) and (B) must together total 100 % w/w.

In a particularly preferred embodiment of the invention, one uses

A. 80 – 90 % w/w copolymers containing hydroxyl groups and made from:
  a. 50 – 60 % w/w styrene,
  b. 10 – 22 % w/w butyl acrylate or butyl methacrylate,
  c. 6.6 % w/w acrylic acid or
    8 % w/w methacrylic acid,
  d. 22 % w/w glycidyl esters of $\alpha$-alkylalkane monocarboxylic acids and/or $\alpha,\alpha$-diethylalkane monocarboxylic acid with the empirical formula $C_{12-14}H_{22-26}O_3$, wherein the amounts of the compounds under (a) to (d) must total 100 % w/w, and B. 10 – 20 % w/w organic triisocyanate, produced by reacting 3 moles hexamethylene diisocyanate and 1 mole of water, wherein (A) and (B) must give together numerical values totalling 100 % w/w.

The invention also comprises a reaction lacquer or varnish, produced by combining the above mentioned components under (A) and (B).

Solvents suitable for the production of the said copolymers are those which do not contain any active hydrogen atoms, such as, for example, alkyl benezenes, such as toluene, xylene, esters, such as acetic acid ethyl ester, acetic acid butyl ester, ether esters of dioles such as methyl glycol acetate or ethyl glycol acetate. Very suitable components (a) are styrene, followed by $\alpha$, o-, m- and p-methyl styrene and halogenized styrenes. When incorporated by polymerization, they impart to the film a high resistance to saponification and good pigment absorption.

It is essential for the reaction lacquers manufactured according to the invention that the content of styrene, $\alpha$-, o-, m- and p-methyl styrene, and halogenized styrene should — either individually or in mixture — be at least 38 % w/w, and preferably 45 to 60 % w/w, related to the solids content. These quantities must be used to impart the lustre to the pigmented film, its hardness, flexibility and the anti-corrosion properties of the reaction lacquer. When the styrene or alkyl styrene content is lower, the hardness of the film decreases, its resistance to chemicals is reduced and the anti-corrosion properties of the films obtained from the reaction lacquers deteriorate.

Generally suitable components (b) are methyl acrylate, ethyl acrylate, propyl acrylate, isopropyl acrylate, butyl acrylate, isobutyl acrylate, tert. butyl acrylate, hexyl acrylate, octyl acrylate, 2-ethyl-hexylacrylate, decyl acrylate and dodecyl acrylate. Incorporating also in the polymerization process esters of methacrylic acid, such as methyl methacrylate, butyl methacrylate, isobutyl methacrylate, the light resistance of the lacquer and the hardness may be favorably affected, whilst the application of acrylate ester with four to eight C atoms in the saturated alcohol radical have a favorable effect on the elasticity and bending strength, whilst suitable mixtures make possible the adaptation of acrylates and/or methacrylates.

The content of acrylic acid ester and/or methacrylic acid esters, containing one to 12 carbon atoms in the saturated alcohol radical, must remain within the limits of 0 – 25 % w/w, related to the solids content in the copolymer. Optimum film hardness, resistance to chemical attack and anti-corrosion properties are obtained if the acrylic acid ester and/or methacrylic acid ester content, containing one to four carbon atoms in the alcohol radical, is below 10 % w/w, relative to the solids content in the copolymer. When the acrylate proportion is increased beyond 25 % w/w, the film tends to become soft, to swell, and its resistance to chemicals deteriorates.

Suitable components (c) are acrylic acid or methacrylic acid, maleic acid or fumaric acid, or mixtures thereof. Preferably, acrylic acid or methacrylic acid are used.

Suitable components (d) are glycidyl esters of $\alpha$-alkylalkane mono-carboxylic acids and/or $\alpha,\alpha$-dialkylalkane monocarboxylic acids with the following empirical formula $C_{12-14}H_{22-16}O_3$, either individually or in mixtures. Since the glycidyl radical in the glycidyl ester of the $\alpha$-alkylalkane monocarboxylic acids and/or α,α-dialkylalkane monocarboxylic acids can be expressed by the empirical formula $C_9H_5O$, the α-alkylalkane acids and the α,α-dialkylalkane acids are mixtures of such monocarboxylic acids containing a $C_9$–, $C_{10}$ and $C_{11}$ chain. The method of manufacturing the above mentioned α-alkylalkane monocarboxylic acids are based on the research work, carried out by Dr. H. Koch of the Max-Planck-Institut für Kohlenforschung (Max-Planck-Institute for Coal Research) in Mühlheim, German Federal Republic. The acids are fully saturated and are very strongly substituted on the carbon atom in the α-position. There are no acids with two hydrogen atoms on the α carbon atom, and only 6 – 7 percent of these acids contain one hydrogen atom. Cyclic material also occurs (see: Deutsche Farben Zeitschrift, vol. 16, No. 10, page 435).

It is essential for the reaction lacquers made according to the invention, that the glycidyl esters of α alkylalkane monocarboxylic acids and/or α,α-dialkylalkane monocarboxylic acids, incorporated by polymerization, should be present to 10 – 40 % w/w, and preferably to 15 – 35 % w/w, related to the solids content of the copolymer. When using 10 to 20 % w/w of glycidyl ester of α-alkylalkane mono-carboxylic acids and/or α,α-dialkylalkane monocarboxylic acids in the copolymer, incorporated by polymerization, the hydroxyl content amount to between 0.7 and 1.4 % w/w. If such copolymers are used together with the polyisocyanates, there occurs less cross-linking and therefore higher elasticity of the reaction lacquers. Thus, an increase in the elasticity may be achieved without raising the content of acrylic acid esters, which would result in the drawbacks already mentioned hereinbefore.

The reaction lacquers obtained in this manner show, therefore, still very good anti-corrosion properties and good condensation water tests, but the surface hardness of the film has been somewhat reduced.

If such copolymers are used for the production of the reaction lacquer, containing 20 – 40 % w/w and preferably 20 – 35 % w/w glycidyl ester of α-alkylalkane monocarboxylic acids and/or α,α-dialkylalkane monocarboxylic acid, incorporated by polymerization and related to the solids content of the copolymer, for the combination, wherein the amount of polyisocyanate characterized by the NCO content, in equivalent amounts corresponding to the hydroxyl groups in the copolymer, the increase in the hydroxyl group content in the copolymer causes the reaction lacquers to exhibit, in consequence of the higher polyisocyanate addition, larger cross-linking and therefore an increase in the surface hardness of the film, as well as good resistance of the films to chemicals and condensation water. However, the elasticity of the films is somewhat lower, but is still sufficient if the film is applied to a rigid base; where the lacquer is to be applied to flexible bases, e.g., to leather, the requisite elasticity increase would have to be obtained by using up to 2 % w/w acrylic acid ester with an alcohol radical of four to 12 carbon atoms.

The reaction of the copolymers used for forming the films in accordance with the method of the invention takes place in that manner that the carboxyl groups of the components (c) react with the glycidyl groups of the α-alkylalkane monocarboxylic acids and/or α,α-dialkylalkane monocarboxylic acids of the components (d) so that a free hydroxyl group is formed under formation of an ester, as required for use with the organic polyisocyanates. The reaction takes place under equivalent conditions between the carboxyl and glycidyl groups. The copolymers produced in this manner have acid numbers between 2 and 12, and preferably between 2 and 4.

The following polyisocyanates may be used, for example, as component B:
Toluylene-2,4-isocyanate, toluylene-2,6-diisocyanate, cyclohexylene-1,4-diisocyanate, diphenyl methane-4,4'-diisocyanate, naphthylene-1,5-di-isocyanate, 4,4'-, 4,2-triphenyl methane-triisocyanate, 1-(isocyanato-phenyl)-ethyl isocyanate, or the xylylene diisocyanates, fluorine substituted diisocyanates, ethylene glycol diphenyl ether-2,2'-diisocyanate, diethylene glycol diphenyl ether-2,2'-diisocyanate, 1,1'-dinaphthyl-2,2'-diisocyanate, benzophenone-3,3'-diisocyanate, fluorene-2,7-diisocyanate, anthraquinone-2,6-diisocyanate, pyrene-3,8-diisocyanate, chrysene-2,8-diisocyanate, 1-methylbenzol-2,4,6-triisocyanate, naphthaline-1,3,7-tri-isocyanate, biphenylmethane-2,4,4'-triisocyanate, triphenylmethane-4,4',4''-triisocyanate, 3'-methoxyhexane-diisocyanate, octane-diiso-ω,ω-diisocyanate-1,4-diethylbenzole,ω,ω-diisocyanate-1,4-dimethyl naphthaline, cyclohexane-1,2-diisocyanate, 1-isopropylbenzene-2,4-diisocyanate, 1-chlorobenzene 2,4-diisocyanate, 1-fluorobenzene-2,4-diisocyanate, 1-nitrobenzene-2,4-diisocyanate, 1-chloro-4-methoxy-benzene-2,5-diisocyanate, azobenzene-4,4'-diisocyanate, benzeneazonaphthalene-4,4'-diisocyanate, diphenyl ether-2,4-diisocyanate and diphenyl ether-4,4'-diisocyanate; the polyisocyanates may also be replaced by compounds splitting off polyisocyanates, reaction products of multivalent alcohols with polyisocyanates and containing isocyanate groups, such as, e.g., the reaction product of 1 mole of trimethyl propane with 3 moles of toluylene diisocyanate, as well as trimerized or polymerized isocyanates, such as described substantially in German Pat. No. 951,168.

In addition thereto, a reaction product of 1 mole water and 3 moles hexamethylene diisocyanate with an NCO content of 16 – 17 % w/w could also be considered. This last reaction product of water and hexamethylene diisocyanate is particularly preferred. The NCO content of the reaction product is valid for a 75 % w/w solution in xylene/ethylglycol acetate.

The copolymers are produced by solvent polymerization, wherein the monomers (a) to (c) are reacted in the reaction vessel with the glycidyl ester (d) together with the solvents, the initiators, possibly in the presence of chain breakers, wherein the condensation reaction and the polymerization reaction occur concurrently. In the preferred embodiment, the glycidyl ester is dissolved in the solvent and the monomers (a), (b) and (c) with the initiators and chain breakers are added at a raised temperature — about 80° to 170° C, and the condensation and polymerization are carried out together.

The following initiators may be mentioned, by way of example: azo compounds, peroxide compounds, e.g., benzoyl peroxide, cumolhydro-peroxide or di.-tert.-butyl peroxide. By using also chain breakers such as mercaptan and aldehyde, the degree of polymerization may be adapted to the requirements. Viscosities of $K - Z_4$ (Gardner-Holdt scale) should be aimed at for 60 % w/w resin concentrations in aromatic solvents, e.g., in toluene or xylene, or in ether esters, such as, e.g., ethylglycol acetate.

The method according to the invention may be used only for polymers with molecular weights from about 8,000 to 14,000. These should have a hydroxyl group content of 0.7 – 3.0 % w/w and preferably 1.5 – 2.8 % w/w. The hydroxyl group content relates to the solids in the copolymer.

The reaction of the copolymers A, containing the hydroxyl group, with the organic polyisocyanates may be effected with 0.5 to 1.1 NCO groups per hydroxyl group, according to the intended application of the reaction products. Preferably, the reaction is carried out in that manner that the amounts of the organic polyisocyanate, related to the total hydroxyl content of the components of the reaction mixture, are present at a ratio of 0.7 to 1.0 isocyanate group per hydroxyl group.

The mixtures of copolymers A and polyisocyanate B, containing solvents and hydroxyl groups, are applied by the simplest possible means, possibly after addition of flowing agents, pigments or dyes, by spraying, dipping, pouring, brushing or other means, to the bases and the films thus applied are allowed to dry at room temperature. In special cases, for example, when isocyanate donors are used, the films may be stoved; this will be governed generally by the bases used and by the practical requirements made of the coatings. Also the use of reactive melamine resins may be of advantage. These reactive melamine resins may be added in amounts of up to 100 % w/w and result in an improvement in the lustre of the surface film.

The reaction, and the application of the films to their bases, are effected in solution. Solvents suitable for this purpose are, for example, acetic acid ethyl esters, butyl ester, ether esters, diethyl glycol diacetate, as well as aromatics such as benzene, toluene or xylene. The concentration of these solvents may fluctuate within wide limits and is substantially governed by the solubility of the constituents. Preferably, solutions with a solids content of 20 – 80 % w/w are used. For special applications, for example, for applying films to flexible bases, polymer solutions with lower hydroxyl group contents are possible, resulting in weaker cross-linking. Such copolymers may be mixed in any proportion with the practically typical polyesters and polyethers, containing hydroxyl groups to form blends. The reaction products of such mixtures with polyisocyanates provide coatings which are resistant to alkalis and have properties similar to those described above, whilst the comparatively short drying time is of additional interest.

The method may be used for applying coatings to bases of widely different kinds, e.g., porous and non-porous bases, textile fleeces, leather and plastics. Of particular importance is the coating of wood or metals. Highly lustrous coatings with very high surface hardness are obtained; these coatings are non-porous, elastic and resistant to solvents, may be treated both with strong inorganic acids and with strong alkalis without affecting them even minutely. In addition, these coatings show excellent weathering properties and resistance to yellowing.

It should be stressed more particularly that the coatings or films applied to aluminum sheeting show excellent adhesion as single layer coatings. These coatings may be applied to aluminum by removing the solvent, after the application, during a period of about 30 minutes at between 40° and 50° C; after this period, the coating will be non-sticky so that the surface no longer attracts dust and is no longer sensitive to impact or other mechanical pressures and the lacquered or painted objects may be subjected to further treatment. After 3 to 4 days' hardening at room temperature, the maximum properties are obtained. By raising the temperature to 120° C for 30 minutes, the optimum properties may also be obtained.

MANUFACTURE OF COPOLYMER 1

In a vessel, equipped with stirrer, reflux cooler and thermometer, 528 grammes of xylene and 268 grammes of glycidyl ester α,α-dialkylalkane monocarboxylic acids with the following empirical formula $C_{12-14}H_{22-26}O_3$ with an epoxy equivalent of 240–250 (in the following referred to as "-glycidyl ester α,α-dialkyl monocarboxylic acids), are heated to 140° C and a mixture of 452 grammes of styrene, 80 grammes of acrylic acid and 12 grammes of di.-tert.-butyl peroxide is added uniformly during 2 hours and the mixture is polymerized and condensed during a period of about 8 to 10 hours. The product has a solids content of about 60 % w/w, a viscosity (Gardner-Holdt) of X – Y of the 60 % w/w solution in xylene and an acid number of 4.2. The hydroxyl group content is 2.3 % w/w, related to the solids content in the copolymer.

MANUFACTURE OF COPOLYMER 2

As described for the manufacture of Copolymer 1, 528 grammes of xylene and 181 grammes of glycidyl ester α,α-dialkylalkane monocarboxylic acids are heated to 145° C and the following mixture, consisting of 416 grammes of styrene, 64 grammes of methacrylic acid, 139 grammes of butyl methacrylate and 10 grammes of di.-tert.-butyl peroxide is added uniformly during a period of 2 hours, and the mixture is simultaneously polymerized and condensed during about 9 to 11 hours, under heating to about 140° C. The solids content is about 60.2 % w/w. The viscosity (Gardner-Holdt) in xylene is $Z_1-Z_2$. The acid number reaches 4.9 and the hydroxyl group content is 1.56 % w/w, related to the solids content in the copolymer.

MANUFACTURE OF COPOLYMER 3

As described for the manufacture of Copolymer 1, 528 grammes of xylene, 180 grammes of glycidyl ester α,α-dialkylalkane monocarboxylic acids are heated to 140° C and the following mixture is added uniformly over a period of two hours: 452 grammes of styrene, 54 grammes of acrylic acid, 113 grammes of butyl acrylate and 10 grammes of di-tert.-butyl peroxide. After 8 to 10 hours' simultaneous polymerization and condensation, the solution has a solids content of 60.4 % w/w, an acid number of 3.6 and a viscosity in xylene of Y (measured according to Gardner-Holdt). The hydroxyl group content is 1.5 % w/w, related to the solids content of the copolymer.

EXAMPLE 1

Reaction varnish based on 80.3 % w/w copolymer and 19.7 % w/w organic triisocyanate, both related to the solids content.

I. 534 grammes of Copolymer 1-xylene solution (60 % w/w dissolved solids content) are ground with 600 grammes of titanium dioxide (rutile), 200 grammes of xylene and 100 grammes of ethylglycol acetate to form a varnish.

II. 150 grammes of the pigmented varnish mix (I), containing the copolymer 1, 61.5 grammes of the non-pigmented copolymer 1-xylene solution (60 % w/w solids content) and 23.1 grammes of a 75 % w/w solution of a triisocyanate with an NCO content of 16.5 – 17.0 % w/w, dissolved in a mixture of xylene/ethylglycol acetate at 1:1, produced by reacting 3 moles of hexamethylene diisocyanate and 1 mole water, are diluted with xylene to spraying viscosity and applied to aluminium sheets with a dry coating thickness of 45 to 50 μ, and dried in the air. Non-stickiness is reached according to 30 – 40 minutes. The pendulum hardness (measured after König) was 110 seconds after 3 days, 137 seconds after 7 days, 175 seconds after 14 days, stored at 20° C. The water resistance after four days' drying at 20° C on aluminium sheets is tested as follows: A cross-cut is made, the sheet is heated to 60° – 70° C and hot water is applied for a period of 10 – 15 minutes. There occurred no swelling at the cross-cut, and the hot film could not be removed by scratching with the finger nail. A film dried for 10 days in the air and applied to aluminium sheet showed no tendency to form bubbles in the condensation water test at 50° C after 25 days and the lustre was fully maintained.

EXAMPLE 2

Reaction varnish based on 85 % w/w copolymer and 15 % w/w organic triisocyanate, both related to the solids weight.

I. 534 grammes of copolymer 1-xylene solution (60 % w/w solids content) are ground with 600 grammes of titanium dioxide (rutile), 200 grammes of xylene and 100 grammes of ethylglycol acetate to form a varnish.

II. 150 grammes of the pigmented varnish (I) of this Example, containing the copolymer 1, 68 grammes of the non-pigmented copolymer 1-xylene solution (60 % w/w solids content) and 17.7 grammes of a 75 % w/w solution of the triisocyanate described in Example 1, with an NCO content of 16.5 – 17 % w/w dissolved in a mixture of xylene and ethylglycol acetate at 1:1, produced by reacting 3 moles of hexamethylene diisocyanate and 1 mole water, are diluted with xylene to spraying viscosity and applied to aluminium or steel sheets with a dry layer thickness of 40 – 50μ. The film is air-dried. In the course of a further test, the lacquer is also stoved at 130° C. The pendulum hardness of the film dried on the air at 20° C was 97 after 3 days, 122 after 7 days and 145 seconds after 14 days. The water resistance, tested as in Example 1, gave the following result: No swelling and no scratching of the hot film with the finger nail.

A lacquer stoved for 30 minutes at 130° C on a phosphated iron plate, showed no formation of blisters and no decline in the lustre after 60 hours in boiling washing liquid with a washing agent content of 3 % w/w and a pH range of 10–13; during these 60 hours, the liquid was replaced six times by fresh liquid. The best known self-hardening acrylate resins showed a film with strong swelling already after the third liquid change, whilst after the fourth liquid change the film was destroyed and became detached from its base.

EXAMPLE 3

Reaction varnish based on 84 % w/w copolymer and 16 % w/w organic triisocyanate, both related to the solids content.

I. 534 grammes of copolymer 2-xylene solution (60.2 % w/w dissolved solids content) are ground with 600 grammes of titanium dioxide (rutile), 200 grammes of xylene and 100 grammes of ethylglycol acetate to form a varnish.

II. 150 grammes of the above pigmented varnish preparation (I), containing the copolymer 2-xylene solution (60.2 % w/w dissolved solids content), 65 grammes of the unpigmented copolymer 2-xylene solution (60.2 % w/w solids content) and 18 grammes of a 75 % w/w solution of the tri-isocyanate described in Example 1, are diluted in xylene, applied by spraying to aluminium sheets and air dried, as well as stoved for 30 minutes at 130° C.

The measured pendulum hardness of the film was 116 seconds after 2 days, 137 seconds after 7 days and 161 seconds after 14 days. Also here, the film stoved at 130° C showed no loss of lustre and no formation of blisters after six changes of washing liquid, as described in Example 2.

EXAMPLE 4

Reaction varnish based on 84 % w/w copolymer and 16 % w/w organic triisocyanate, both related to the solids content.

I. 267 grammes of Copolymer 3-xylene solution (60.4 % w/w solids content) are ground with 300 grammes of titanium dioxide (rutile), 100 grammes of xylene and 50 grammes of ethylglycol acetate to form a varnish.

II. 160 grammes of the above mentioned pigmented preparation (I), containing the copolymer 3, and 70 grammes of the unpigmented copolymer 3-xylene solution (60.4 % w/w solids content), and 20 grammes of a 75 % w/w solution of the triisocyanate described in Example 1 are diluted with xylene to spraying viscosity and applied to aluminium sheets at 40–50 $\mu$ dried on the air or stoved at 130° C.

The pendulum hardness of the air-dried coating at 20° C was 88 seconds after 3 days, 116 seconds after 7 days and 153 seconds after 14 days. After air hardening and subsequent stoving at 130° C, the film has an Erichson indentation of 8 to 9 mm on steel plate. Films hardened on aluminium sheets can be bent through 180° without causing the film to tear.

EXAMPLE 5

Reaction varnish based on 76 % w/w Copolymer and 24 % w/w organic triisocyanate, both related to the solids weight.

100 grammes of the pigmented preparation I, given in Example 1 under (I), containing Copolymer 1, 38 grammes of the unpigmented copolymer 1-xylenesolution (dissolved solids content 60 % w/w) and 21.5 grammes of a 67 % w/w solution of a triisocyanate with an NCO content of 11.5 % w/w dissolved in a mixture of xylene/ethylglycol acetate at 1:1, produced by reacting 3 moles toluylene diisocyanate and 1 mole trimethylol propane, are diluted with a 1:1 mixture of xylene and ethylglycol acetate, applied by spraying to steel plate and stoved at 130° C for 30 minutes.

The pendulum hardness was 198 seconds. The film showed good elasticity and nail hardness. Also the resistance to shoe polish and lipstick was good.

As already mentioned hereinbefore, 1 – 10 % w/w reactive melamine resins may be used as bonding agents, related to the weight of the bonding agent component. Such reactive melamine resins, adapted to be used either individually or in mixture, are, for example, monomethylol-pentamethoxymethylene melamine, dimethylol-tetramethoxymethylene melamine or trimethylol-trimethoxymethylene melamine.

EXAMPLE 6

Reaction varnish based on 70 % w/w copolymer, 22 % w/w organic triisocyanate and 8 % w/w of a mixture of monomethylol-pentamethoxymethylene melamine and dimethylol-tetramethoxymethylene melamine.

150 grammes of the pigmented preparation I of Example 1, (I), containing the Copolymer 1, 61.5 grammes of the unpigmented Copolymer 1-xylene solution (60 % w/w solids content), 11.5 grammes of a mixture (about 80:20 % w/w to 20:80 % w/w) of monomethylol-pentamethoxymethylene melamine and dimethylol-tetramethoxymethylene melamine in a 70 % w/w solution in ethylglycol acetate, and 29 grammes of a 75 % w/w solution of the triisocyanate described in Example 1 are diluted to spraying viscosity by a mixture of xylene and ethylglycol acetate, applied to steel plate in a dry film thickness of 45 – 50 $\mu$ and air dried.

The test was repeated, and the varnish was stoved at 130° C for 30 minutes on steel plate. The air and oven dried film has an Erichson indentation of 7 – 8 mm, showed very good results in the salt spray test and very good results in the lustre during a weathering test of two years' duration in Florida.

The combinations of A and B used in the method according to the invention dry physically so that dust free drying is achieved within 15 – 30 minutes, according to the solvent used.

The final drying of air dried systems is completed only after the lapse of a few days.

The best results are obtained with the Copolymer No. 1. Amongst the examples given, Example 1 gives the best results.

The best embodiments are characterized by the following advantages:

Drying of repair and stoving varnishes:

A substantially accelerated reaction with polyisocyanates may be found from 80° C, but a gradual improvement in the complete hardening is achieved from 50° C.

Stoving enamels are usually hardened in the temperature range from 120° to 180° C. The following recommendations may be made for the stoving of heat-curable films:

| Stoving temperature | Stoving time |
| --- | --- |
| 50° C. | 60–180 min. |
| 80° C. | 60–120 min. |
| 120° C. | 30–35 min. |
| 140° C. | 20–30 min. |
| 160° C. | 10–20 min. |
| 180° C. | 8–15 min. |

Elasticity and Impact Toughness:

Both air and oven dried films give high values in the reverse impact test and in the Erichson indentation; these values are rarely reached by comparable products known in the prior art.

Adhesion:

The films adhere to many difficult materials, such as aluminium, tinplate, zinc-plated plate, brass, copper, silver, and the like. The adhesion to steel and bonded sheet is excellent.

Resistance of stoved varnishes to chemicals:

Of particular interest is the excellent resistance of the films to boiling washing liquid after stoving at 130° C for only 30 minutes. Apart from that, single layer coatings on steel of aluminium, stoved at 130° C/30 min., are fully equivalent to self-bonding agents based on acrylic resin, insofar as their resistance to shoe polish, lipstick, xylene, acetic acid or sodium lye is concerned.

Resistance of the films to corrosion:

Optimum resistance to corrosion is achieved with aliphatic poly-isocyanates. The non-porous varnish films make it possible, for example, to apply single layer coatings to different metals (such as steel, aluminium, zinc-plated steel). These films have extraordinarily high stability when tested according to the condensation water-alternating conditions test (German Standard DIN 50 017), the Kesternich test (German Standard DIN 50 018) and the salt spray test (DIN 50 907). The excellent resistance to washing liquid has already been mentioned.

Respraying of air-dried systems:

There are no difficulties when respraying with the same material during all drying stages.

Resistance to atmospheric conditions:

Cross-linking with aliphatic polyisocyanates (Component B) yields an excellent resistance to atmospheric changes, because the hydroxyl functional acrylic resin component A is extraordinarily resistant to the weather.

Storage stability:

Reaction varnishes containing polyisocyanates have only a limited pot life, depending on the type of the isocyanate, the temperature, the concentration of the isocyanate, the hydroxyl number of the polymer resin and other factors.

A white pigmented lacquer, containing Desmodur N as hardener, set to spraying viscosity, undergoes, according to the ambient temperature, a viscosity rise by about 100 percent after 20 – 30 hours. This may be countered in the following manner:

Either the preparation is cooled in a refrigerator after it has been prepared, or as much isocyanate-free lacquer as possible is added, and a correction with isocyanate is carried out on the following day.

The drawings explain and illustrate the process according to the invention:

Figure 1:
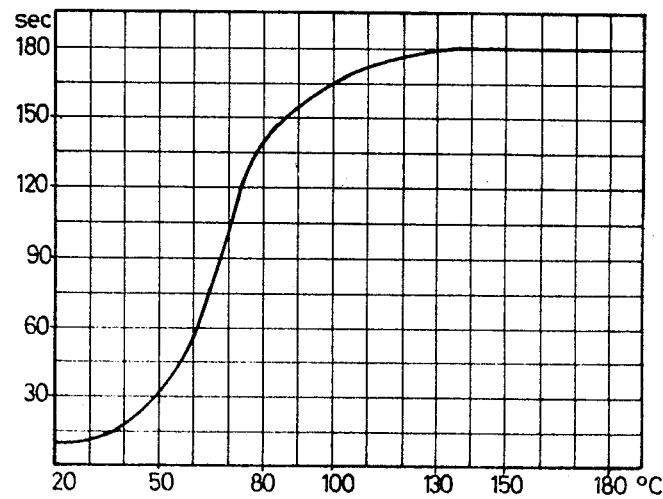
FIG. 1 shows the pendulum hardness in seconds as a function of the stoving temperature in ° C with a constant stoving time of 30 minutes, using the test film according to Example 1.
Figure 2:
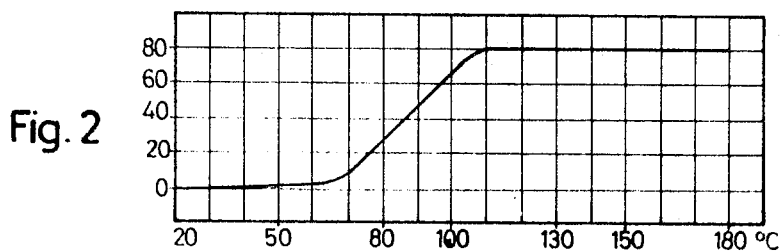
FIG. 2 shows the results of the reverse impact test in inch-pounds as a function of the stoving temperature in ° C with a constant stoving time of 30 minutes, using the test film according to Example 1.
Figure 3:
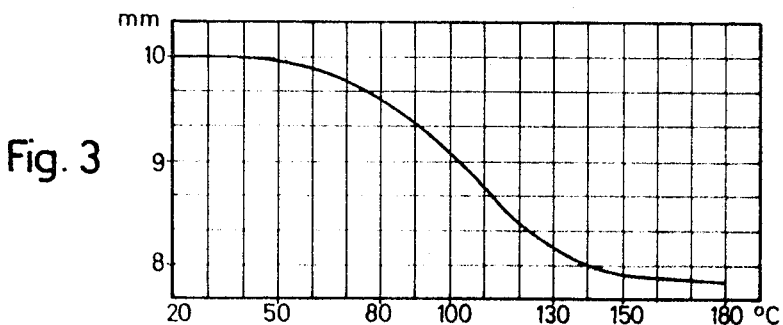
FIG. 3 shows the results of the Erichson indentation in mm, as a function of the stoving temperature in ° C with a constant stoving time of 30 minutes, using the test film according to Example 1.
Figure 4:
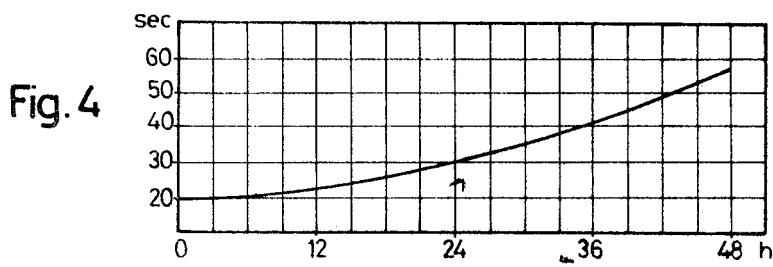
FIG. 4 shows the results of the pot life test in seconds as a function of the pot life in hours at constant temperature of 20° C, using again a preparation according to Example 1.

By way of summary, it may be stated that the method according to the invention yields coatings and films with excellent properties.

The above mentioned product Desmodur N is a product of the firm Farbefabriken Bayer AG, Leverkusen, Germany, and is substantially an organic triisocyanate, obtained by reacting 3 moles of hexamethylene diisocyanate with 1 mole of water.

I claim:

1. In an improved method for manufacturing surface coatings and films from reaction products of polyhydroxyl compounds based on copolymers containing hydroxyl groups and polyisocyanates in solvents without active hydrogen atoms, the improvement comprising reacting
   A. 70 – 94% w/w of copolymers containing hydroxyl groups and made from:
      a. 38 – 70% w/w of styrene or alkyl styrene, the alkyl groups of which have one to three carbon atoms, or a mixture of such alkyl groups,
      b. 0 – 25% w/w of acrylic acid ester or methacrylic acid ester, containing one to 12 carbon atoms in the saturated alcohol radical, individually or in mixture,
      c. 3 – 15% w/w of an $\alpha,\beta$-ethylenically unsaturated monocarboxylic or dicarboxylic acid,
      d. 10 – 40% w/w of glycidyl ester $\alpha$-alkylalkane monocarboxylic acids or $\alpha,\alpha$-dialkylalkane monocarboxylic acids with the following empirical formula $C_{12-14}H_{22-26}O_3$, individually or in mixture, wherein the amounts of compounds (a) to (d) must total 100 percent by weight; with
   B. 6 – 30% w/w of organic polyisocyanate, wherein (A) and (B) together must total numerical values of 100 percent by weight.

2. A method as set forth in claim 1, wherein the components are used as follows:
   A. 75 – 90 % w/w copolymers containing hydroxyl groups and made from:
      a. 45 – 60 % w/w styrene or vinyl toluene,
      b. 0 – 20 % w/w acrylates or methacrylates of saturated mono-alcohols with one to 12 carbon atoms individually or in mixture,
      c. 5 – 10 % w/w of acrylic acid or methacrylic acid,
      d. 15 – 35 % w/w of glycidylester $\alpha$-alkylalkane monocarboxylic acids or $\alpha,\alpha$-dialkylalkane monocarboxylic acids with the empirical formula $C_{12-14}H_{22-26}O_3$, wherein the amounts of the compounds (a) to (d) must total 100 % w/w and
   B. 10 – 25 % w/w of organic polyisocyanate, wherein (A) and (B) must give numerical values totaling 100 % w/w.

3. A method as set forth in claim 1, wherein the components are used as follows:
   A. 80 – 90 % w/w copolymer containing hydroxyl groups and made from:
      a. 50 – 60 % w/w of styrene,
      b. 10 – 22 % w/w of butyl acrylate or butylmethacrylate,
      c. 6.6 % w/w of acrylic acid or 8 % w/w of methacrylic acid,
      d. 22 % w/w of glycidyl ester $\alpha$-alkylalkane monocarboxylic acids with the empirical formula $C_{12-14}H_{22-26}O_3$, wherein the amounts of the compounds (a) to (d) must total 100 % w/w, and
   B. 10 – 20 % w/w of organic triisocyanate, produced by reacting 3 moles hexamethylene diisocyanate with 1 mole water, wherein the components (A) and (B) must give numerical values totalling 100 % w/w.

4. A method as set forth in claim 1, wherein 1 to 10% by weight of a reactive melamine resin is employed additionally.

5. A method as set forth in claim 1, wherein the copolymer containing hydroxyl groups has average molecular weights between 8,000 and 14,000.

6. A method as set forth in claim 5, wherein the copolymer containing hydroxyl groups has a hydroxyl content of 0.7 to 3.0 percent w/w.

7. A method as set forth in claim 1, wherein 0.5 to 1.1 NCO-groups of the polyisocyanate are brought to reaction with each hydroxyl group of the copolymer containing hydroxyl groups.

8. A coating on wood, metal, textile fleeces, leather or synthetic resins, whenever prepared according to claim 1.

9. A coating on wood, metal, textile fleeces, leather or synthetic resins, whenever prepared according to claim 2.

10. A coating on wood, metal, textile fleeces, leather or synthetic resins, whenever prepared according to claim 3.

* * * * *

Nielsch-2

UNITED STATES PATENT OFFICE
CERTIFICATE OF CORRECTION

Patent No. 3,666,833      Dated May 30, 1972

Inventor(s)   Dr. Horst Dalibor et al.

It is certified that error appears in the above-identified patent and that said Letters Patent are hereby corrected as shown below:

PATENT READS:

Col. 2, line 26
"benezenes"

Col. 2, line 73
"$C_{12-14}H_{22-16}O_3$"

APPLICATION READS:

Page 4, line 3
---benzenes---

Page 5, line 15
---$C_{12-14}H_{22-26}O_3$---

Signed and sealed this 26th day of December 1972.

(SEAL)
Attest:

EDWARD M. FLETCHER, JR.
Attesting Officer

ROBERT GOTTSCHALK
Commissioner of Patents

UNITED STATES PATENT OFFICE
CERTIFICATE OF CORRECTION

Patent No. __3,666,833__ - Dated __May 30, 1972__

Inventor(s) __Horst Dalibor, et al.__

It is certified that error appears in the above-identified patent and that said Letters Patent are hereby corrected as shown below:

| PATENT READS: | APPLICATION READS: |
|---|---|
| Col. 3, line 54 | Page 6, line 29 |
| "using up to 2% w/w acrylic acid ester: | --using up to 25% w/w acrylic acid ester-- |
| Col. 6, line 35 | Page 12, lines 11 and 12 |
| --is reached according to 30-40 minutes." | --is reached after 30-40 minutes-- |
| Col. 6, line 36 | Page 12, line 12 |
| "(measured after König)" | --(measured according to König)--. |

Signed and sealed this 5th day of March 1974.

(SEAL)
Attest:

EDWARD M. FLETCHER, JR.
Attesting Officer

C. MARSHALL DANN
Commissioner of Patents